(12) United States Patent
Shih et al.

(10) Patent No.: US 8,121,842 B2
(45) Date of Patent: Feb. 21, 2012

(54) AUDIO OUTPUT OF A DOCUMENT FROM MOBILE DEVICE

(75) Inventors: Sheng-Yao Shih, Taipei (TW); Yun-Chiang Kung, Taipei (TW); Chiwei Che, Beijing (CN); Chih-Chung Wang, Taipei (TW)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 12/333,325

(22) Filed: Dec. 12, 2008

(65) Prior Publication Data

US 2010/0153114 A1 Jun. 17, 2010

(51) Int. Cl.
*G10L 13/08* (2006.01)
(52) U.S. Cl. ........................................ 704/260
(58) Field of Classification Search .................. 704/260
See application file for complete search history.

(56) References Cited

U.S. PATENT DOCUMENTS

| | | | |
|---|---|---|---|
| 6,446,041 B1 | 9/2002 | Reynar et al. | |
| 6,816,578 B1 | 11/2004 | Kredo et al. | |
| 6,934,684 B2 * | 8/2005 | Alpdemir et al. | 704/265 |
| 7,137,126 B1 * | 11/2006 | Coffman et al. | 719/328 |
| 7,376,434 B2 | 5/2008 | Thomas et al. | |
| 7,412,040 B2 | 8/2008 | Koch | |
| 7,529,675 B2 * | 5/2009 | Maes | 704/270.1 |
| 7,685,252 B1 * | 3/2010 | Maes et al. | 709/217 |
| 7,729,916 B2 * | 6/2010 | Coffman et al. | 704/270 |
| 7,831,429 B2 * | 11/2010 | O'Hagan | 704/270 |
| 7,844,215 B2 * | 11/2010 | Vance et al. | 455/3.06 |
| 2002/0062393 A1 | 5/2002 | Borger et al. | |
| 2006/0064499 A1 | 3/2006 | Sharma et al. | |
| 2006/0230169 A1 | 10/2006 | Kaplan et al. | |
| 2007/0155346 A1 | 7/2007 | Mijatovic et al. | |
| 2008/0039010 A1 | 2/2008 | Vance et al. | |

OTHER PUBLICATIONS

"Read it to Me", Retrieved at<<https://sourceforge.net/projects/readittome/>>, Sep. 29, 2008, p. 1.
Mult, et al., "VoiceXML—Applications for E-Commerce and E-Learning", Retrieved at<<http://www.fh-dortmund.de/de/ftransfer/medien/reusch1.pdf>>, 2001-2004, pp. 230-233.

* cited by examiner

*Primary Examiner* — Susan McFadden
(74) *Attorney, Agent, or Firm* — Zete Law, P.L.L.C.; MacLane C. Key (57) ABSTRACT

Architecture for playing a document converted into an audio format to a user of an audio-output capable device. The user can interact with the device to control play of the audio document such as pause, rewind, forward, etc. In more robust implementation, the audio-output capable device is a mobile device (e.g., cell phone) having a microphone for processing voice input. Voice commands can then be input to control play ("reading") of the document audio file to pause, rewind, read paragraph, read next chapter, fast forward, etc. A communications server (e.g., email, attachments to email, etc.) transcodes text-based document content into an audio format by leveraging a text-to-speech (TTS) engine. The transcoded audio files are then transferred to mobile devices through viable transmission channels. Users can then play the audio-formatted document while freeing hand and eye usage for other tasks.

20 Claims, 8 Drawing Sheets

AUDIO OUTPUT OF A DOCUMENT FROM MOBILE DEVICE

BACKGROUND

As mobile connections become more mature and the business needs of mobile work continue to grow, business opportunities emerge around mobile scenarios. Typical mobile scenarios include managing personal information, communication via phone, email, instant messaging, short messaging, web browsing, accessing documents and information, searching information, receiving notification of critical events or incidences, and more.

Conventional solutions do not address the issue that in certain mobile environments, users may not be able to fully concentrate on viewing the document content due to the need to divert eye and hand activity from the task at hand to interacting with the document presentation technology. A typical scenario can be a commuter driving back and forth between home and work. Diverting attention away from important tasks such as driving is occurring in greater frequency as commuters are having accidents due to distractions for text messaging, reading electronic documents such as email and word processing documents, and so on. These tactile interactions require more focused user attention when alternative technologies could be employed to reduce the impact of such user behavior.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture plays a document converted into an audio format to a user of an audio-output capable device. The user can interact with the device to control play of the audio document such as pause, repeat paragraph, next chapter, rewind, forward, etc. In more robust implementation, the audio-output capable device is a mobile device (e.g., cell phone) having a microphone for receiving and processing voice input. Voice commands can then be input to control play of the document audio file to pause, rewind, fast forward, etc. The architecture can be employed in any environment where user activity occupies visual and hand (or other extremities) actions and that permits aural and voice communications usage, such as in vehicles, exercise equipment, wire/wireless headsets for mobile device, and so on.

In one implementation, a communications server (e.g., email, attachments to email, etc.) transcodes text-based document content into an audio format by leveraging a text-to-speech (TTS) engine on the server side. The transcoded audio files are then transferred to mobile devices through viable transmission channels. Users can then play the audio-formatted document while freeing hand and eye usage to other tasks.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture converts (transcodes) text-based document content into an audio format by leveraging a text-to-speech (TTS) engine on the server side. The transcoded audio files are then transferred (e.g., streamed, full file transfer) to mobile devices and mobile clients through viable transmission channels (e.g., IP networks, cellular networks, etc.). Users can then listen to converted text information from documents, for example, without diverting eyes and hands from other tasks. The user can issue voice commands to control reading operations such as pause, repeat paragraph, next chapter, etc.

The transcoding of document content to various audio formats can be performed on a server. By incorporating the TTS engine on the same server that stores documents, for example, improved scalability is provided both around storage capacity and processing scalability, for transcoding of document content to audio formats. Employing the transcoding service on the server also facilitates collaborative scenarios such as document reviewing.

Because the size of transcoded audio output of the document content could be large, methods for communicating the large files effectively and efficiently are employed such as streaming of transcoded audio files from server to mobile devices. The mobile device can include a client(s) that handle media streaming and audio playback. Voice command capability at the client frees eye and hand use for other purposes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
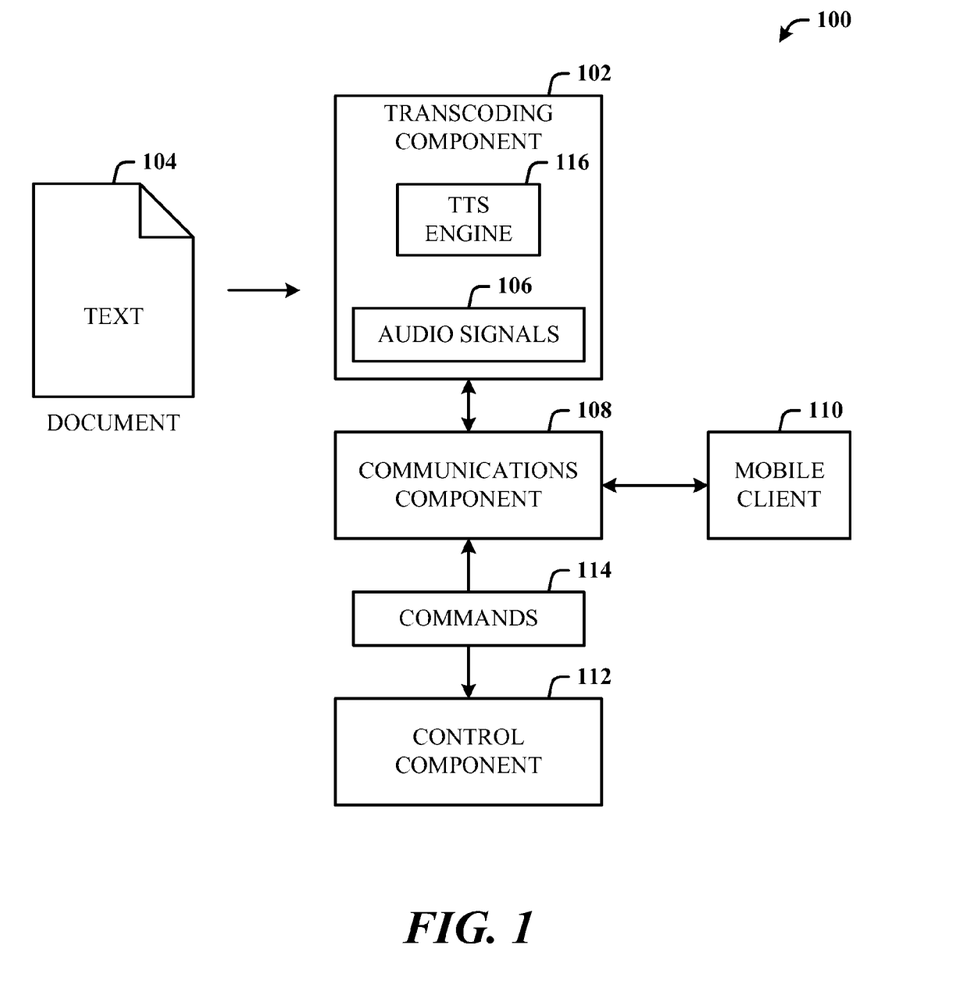
FIG. 1 illustrates a computer-implemented data presentation system.

FIG. 1 illustrates a computer-implemented data presentation system 100. The system 100 includes a transcoding component 102 for converting text of a document 104 into audio signals 106 (e.g., an audio file or speech file). A communications component 108 communicates the audio signals 106 to a mobile client 110 for audio presentation. A control component 112 controls the presentation of the audio signals 106 based on received commands 114.

The text (e.g., alphabetic, numeric) of the document 104 includes text of a word processing document, a spreadsheet document, a presentation document, email content, email header information, email related information, and/or email attachment. In the word processing document, text can be converted and navigation obtained throughout the audio file using speech control. Embedded links in the document can be voiced, and in one implementation, a description of the linked-to document or information can be obtained and converted into the audio file for play to the user. Similarly, if the document includes an image with an image title or descriptor, this can be converted for play as well.

Where the document 104 is a spreadsheet document, text and/or numbers can be converted, as well as row information, column information, header information, page number, sheet name, cell identification, and so on. Voice commands can then be employed to navigate over the document (via the audio file) based on any one or more of these pieces of information.

Where the document 104 is a presentation document readable text on slides and comments can be extracted and converted, as well as page numbers to assist the user in understanding via the audio file the location of the conversion point. The user can then use voice commands to move back and forth over the audio file to select where to listen to the document content.

Related to messaging such as emails, the content of the email can be extracted and converted to an audio file for listening. As well, the email attachment can be converted into the same audio file as the email content, as a separate file from the content audio file, and/or the attachment can be selected solely for transcoding without the email. Still further email header information can be captured and transcoded so the user can listen only to the header information such as time, date, subject, sender(s), recipient(s), etc. Based on this information, the user can then interact with the client 110 to select the email and cause the email to be transcoded at the server and downloaded (e.g., streamed, single file) to the client 110.

The communications component 108 can stream the audio signals 106 to the mobile client 110. Alternatively, the audio signals 106 can be encapsulated in an audio file and the audio file is then sent to the client 110 for play and manipulation. This flexibility addresses situations where the client device may be a legacy device with reduced playback and control capabilities. Thus, play (presentation) can be streamed from the communications component 108 (and transcoding component 102), and the commands 114 are received and processed using the communications component 108 and the control component 112.

The client 110 can be located in different settings. For example, the client 110 can be in a cell phone, personal digital assistant (PDA), vehicle, and so on. Additionally, the commands can be input by voice, keypad keys, touch pad, stylus, light pen, etc. Speech commands offer an optimum control mechanism because the hands and eyes of the user can then be available for other purposes (e.g., driving, walking, etc.). Commands by tactile interaction such as keys or touch pads are possible in certain settings such as strolling, walking, sitting, etc. In other words, commands can be received that originate from a vehicle-based client, are speech input to the mobile client, and can be generated based on tactile interaction with the mobile client 110. The communications component 108 receives the commands 114 and communicates the audio signals 106 to the mobile client 110 via a cellular carrier and/or an IP-based communications technology (e.g., the Internet).

The transcoding component 102 can include a TTS engine 116 for converting the text into the audio signals 106. The transcoding component 102 converts the text of the document 104 into the audio signals 106 in response to selection of document information on the mobile client 110.

Put another way, the data presentation system 100 comprises the transcoding component 102 for converting text of the document 104 into a speech file in response to request of the document 104 by the mobile client 110, the communications component 108 for receiving the request and communicating the speech file to the mobile client 110 for audio output, and the control component 112 for controlling the presentation of the speech file based on commands received from the mobile client 110.

The text of the document 104 can include text of a word processing document, a spreadsheet document, a presentation document, email content, email header information, email related information, or email attachment, which are converted into the speech file for audio output at the mobile client 110. The communications component 108 streams the speech to the mobile client 110 over an IP-based communications channel in response to commands originated from speech input to the mobile client 110. The commands 114 facilitate navigation of the document text via navigation of the speech file relative to a starting point and an ending point of the speech file.

The control component 112 receives and processes the commands 114 that facilitate navigation of the document text by character, word, sentence, paragraph, page, data type, and document type, for example. The control component 112 receives a request in response to selection of document information on the mobile client 110. The transcoding component 102 converts the text of the document 104 into speech in response to the request, and the communications component 108 streams the speech to the mobile client 110 for audio output. Note that streaming can include transmitting the already transcoded portions of the text to the client 110 while other portions have yet to be transcoded.

Figure 2:
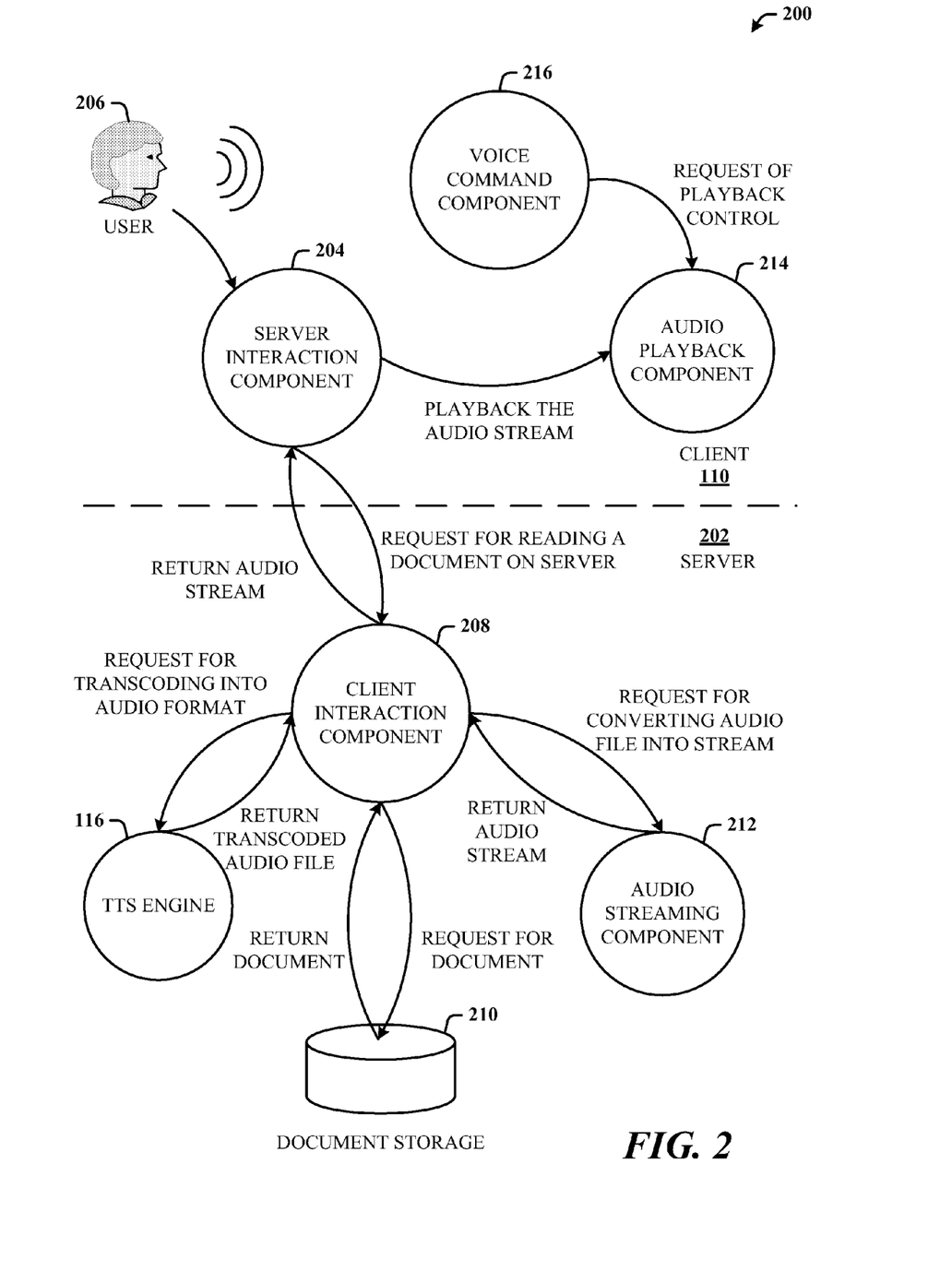
FIG. 2 illustrates a data flow diagram showing entities on both the client and a server the data interaction therebetween.

FIG. 2 illustrates a data flow diagram 200 showing entities on both the client 110 and a server 202 and the data interaction therebetween. The client 110 is depicted as including a server interaction component 204 via which a user 206 initiates a request for a document to be heard. The server interaction component 204 (on the client 110) provides an interface to a counterpart on the server 202—a client interaction component 208. The client interaction component 208 serves as a central interface to server entities that facilitate accessing a document storage, retrieving the document (e.g., email), transcoding the document content into audio, and streaming the audio to the client 110.

Upon receiving the request, the client interaction component 208 sends a request for the document to document storage 210, which returns the document to the client interaction component 208. The client interaction component 208 then sends the document to the TTS engine 116. The TTS engine 116 transcodes the document content into an audio format and returns the audio format to the client interaction component 208. The client interaction component 208 sends the audio format file to an audio streaming component 212, which begins streaming the audio file through the client interaction component 208 to the server interaction component 204 on the client 110. The server interaction component 204 routes the audio stream to an audio playback component 214 for presentation. The user 206 can then voice commands to a voice command component 216 that requests playback control to the audio playback component 214 to manipulate playback of the audio file.

In other words, in this particular implementation, there are client components on a mobile device and server components on the server side. The client components include the server interaction component 204 for interacting with the server 202, sending user requests, and receiving the audio stream. The voice command component 216, which can be part of a client UI on a mobile device receives and processes spoken user operational commands. The audio playback component 214 plays the audio stream from the server 202.

The server components include the document storage 210 such as a database or similar storage that stores documents (e.g., an email server, message server, document database, etc.), the TTS engine 116 that transcodes document content into the audio format, the audio streaming component 212 that converts the audio file into a stream progressively, and the client interaction component 208—the frontier component that communicates with mobile devices, taking user requests, and sending the audio stream.

The trigger for initiating and listening to document playback can be from a user action on the mobile device to navigate and open the document on the server 202 for reading. The TTS engine 116 transcodes the document into an audio format. At the same time the audio streaming component 212 converts the audio file into a stream progressively while the TTS engine 116 continues transcoding the remaining content of the document. As long as there is sufficient buffer of the stream produced by audio streaming component 212, the client interaction component 208 starts transmission of audio stream of the transcoded document content in the audio format. When the server interaction component 204 on the mobile device receives the audio stream from the server 202 and passes the stream to the audio playback component 214 to play, the user 206 starts to hear the reading of document content.

During the experience of "reading" the document to the user 206, the user 206 may be interrupted and chooses to put the document reading on hold. In such a case, the user 206 can simply speak "Pause", and the voice command component 216 on the mobile device receives the command and requests the audio playback component 214 to pause the playback. After pausing, a subsequent voice command "Play" can resume the playback.

Voice commands that can be interpreted and processed by the voice command component 216 can include, but are not limited to, for example, "Pause" to pause the playback, "Play" to resume the playback, "Repeat Sentence" to re-read from the beginning of the current sentence, "Repeat Paragraph" to re-read from the beginning of the current paragraph, "Next Paragraph" to skip the current paragraph and start from the beginning of the next paragraph, "Next Chapter" to skip the current chapter and start from the beginning of the first paragraph in the next chapter, "Page N", where N is an integer, to jump to the start of page N and start reading, and, "Restart" to re-read the whole document over again, for example. Other commands can be programmed as desired, such as "Back <content segment>", where <content segment> can be a word, line, sentence, paragraph, page, link, etc., to move back the voiced segment parameter.

Figure 3:
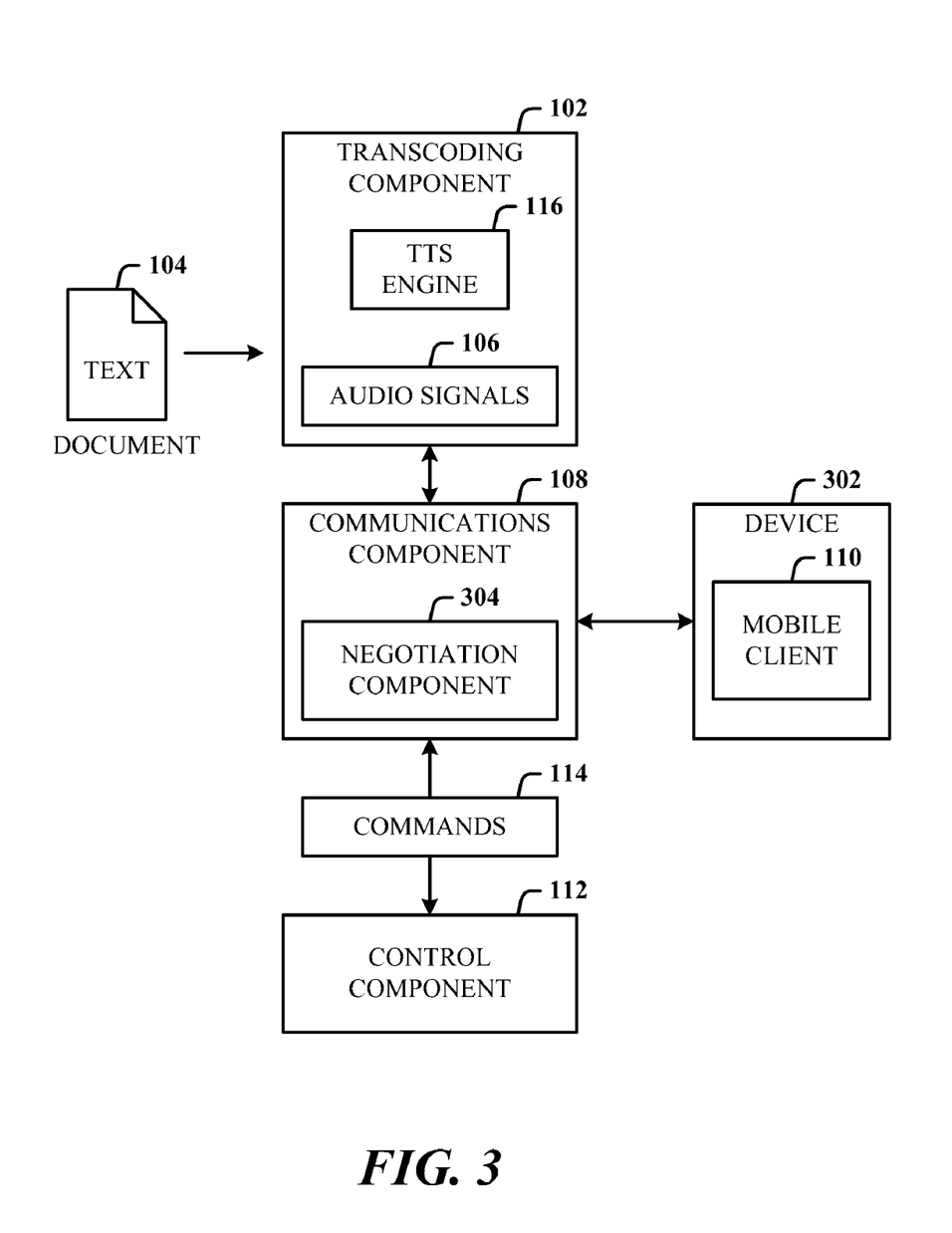
FIG. 3 illustrates an alternative embodiment of a system where data processing is based on device capabilities.

FIG. 3 illustrates an alternative embodiment of a system 300 where data processing is based on device capabilities. The client 110 can be associated with a device 302 (e.g., handheld, vehicle mounted, etc.) that has hardware and/or software limitations that if not considered can impact performance of the data control and presentation capabilities described herein. Accordingly, the server-side communications component 108 can include a negotiation component 304 that requests or interrogates the capabilities of the device 302. This capabilities information can then be processed by the server to determine what mode of document transcoding can be employed for the optimum user experience.

For example, if the device capabilities indicate reduced capabilities, the system 300 can operate as described above by streaming the audio file to the device 302 for playback and voiced commands. However, if the device capabilities are robust, and the client device 302 includes a TTS engine, for example, it can be possible that the server sends the document data to the client device 302 for transcoding and controlled presentation at the device 302 using a client control component. In all cases, caching can be employed in the server and/or the client 110 as well.

The transcoding and presentation architecture can also include the capability of translating the document content into another language before transcoding to the speech file. Further, the selected document can be translated and then transcoded into multiple different languages. The user can then select the language in which to hear the document. In yet a more sophisticated embodiment, the disclosed architecture can be employed as a language training system where parts (e.g., words, sentences, paragraphs, etc.) of a single document can be separately translated and transcoded. For example, a sentence can be translated into a first language and a second language, a second sentence can be translated into the first language and the second language, and so on.

Transcoding and streaming then allows the user to exercise language skills hands free and eyes free, with voice controlled audio file navigation. Still further, voice control can be in the different languages. This capability may include language models at server-side to handle the heavy processing utilized for translation algorithms and language models. Negotiation can also be employed to test the client device for hardware/software capabilities for sharing or offloading processing as desired.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
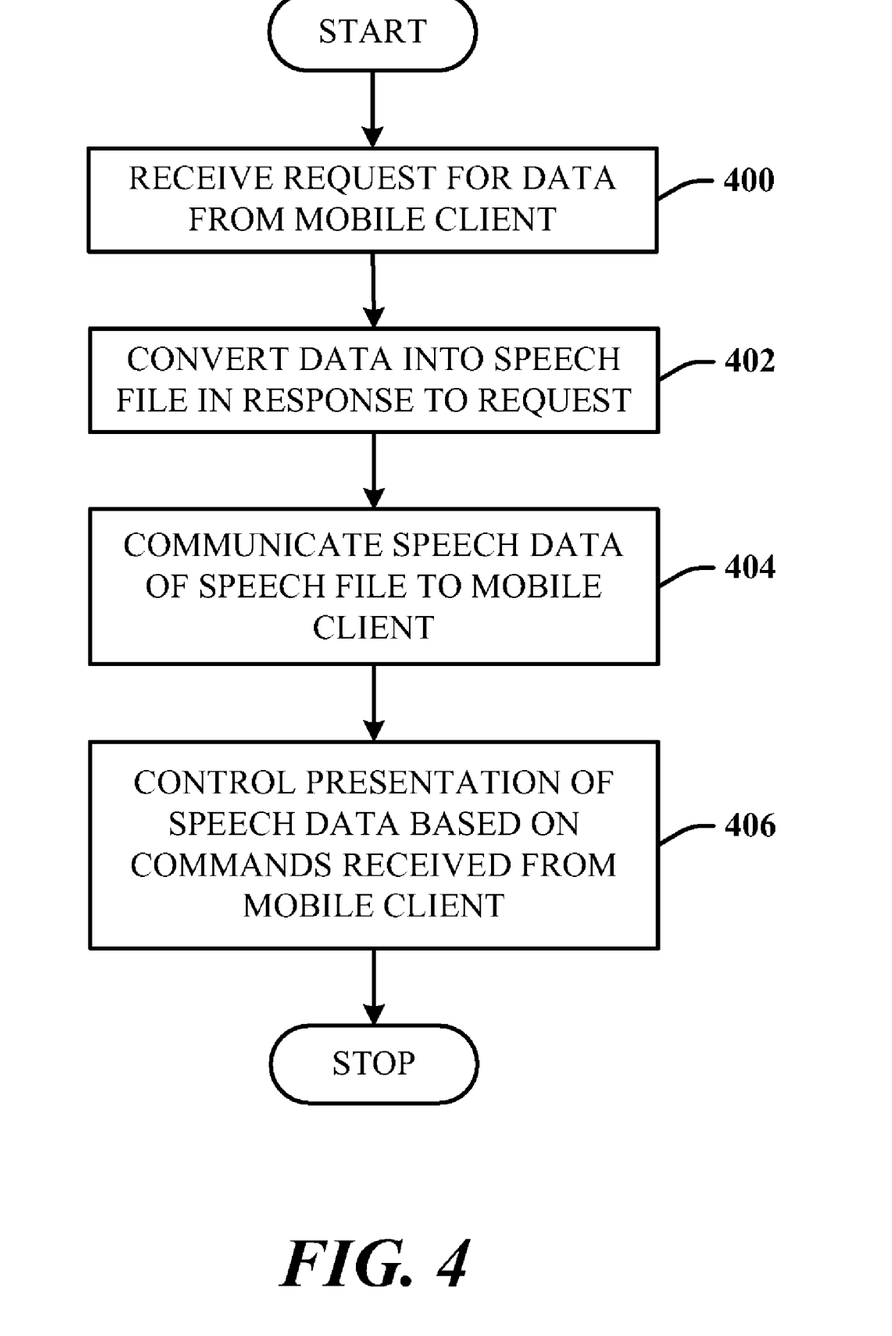
FIG. 4 illustrates a method of presenting data.

FIG. 4 illustrates a method of presenting data. At 400, a request for data is received from a mobile client. At 402, the requested data is converted into a speech file in response to the request. At 404, speech data of the speech file is communicated to the mobile client. At 406, presentation of the speech data is controlled based on commands received from the mobile client.

Figure 5:
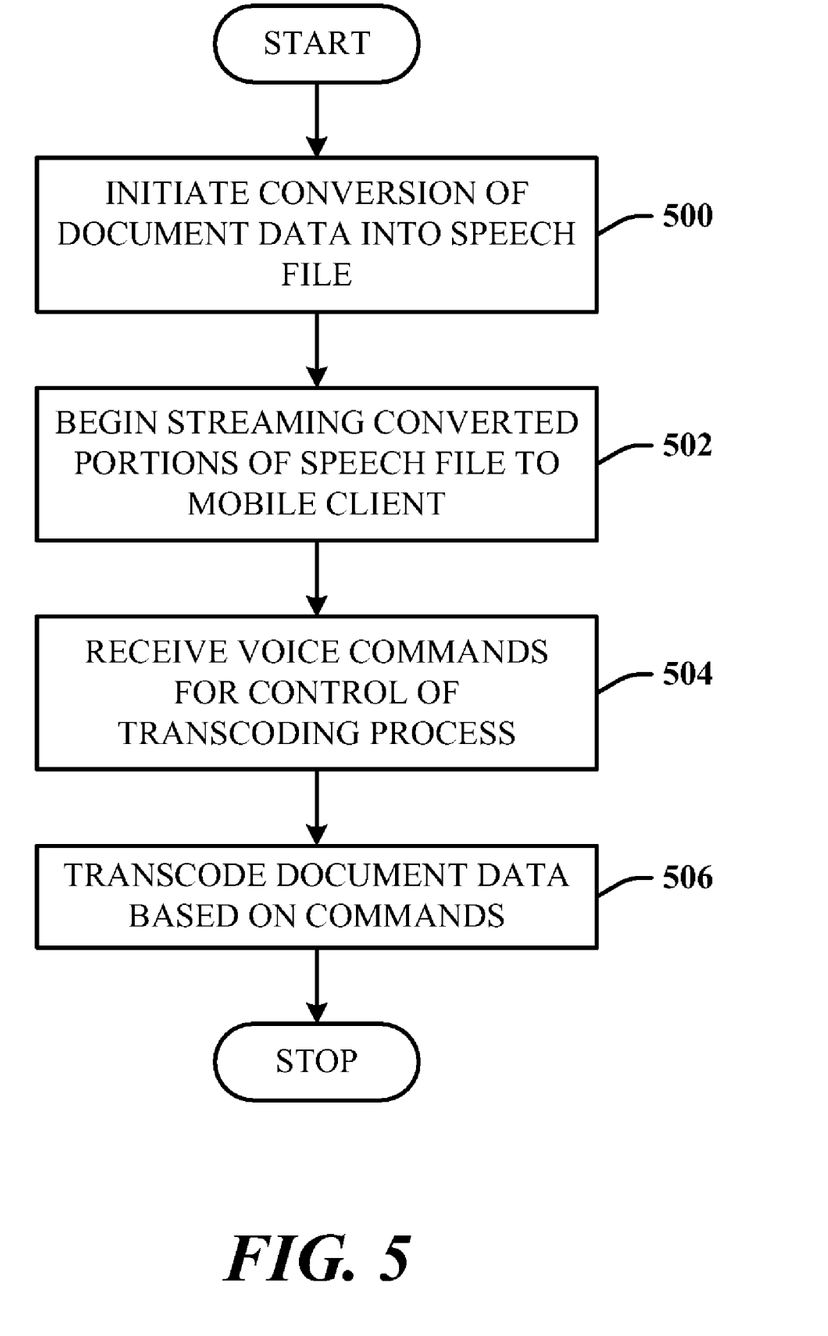
FIG. 5 illustrates a method of controlling the presentation of document data.

FIG. 5 illustrates a method of controlling the presentation of document data. At 500, conversion of the document data into a speech file is initiated. At 502, streaming of portions of the speech file to the mobile client is begun. At 504, voice commands for control of the transcoding process are received. At 506, the transcoding of the document data is controlled based on the commands. An optimum method of utilizing transcoded data during the transcoding process is to cache the transcoded portions on the server for communication to the client, cache the portions received at the client in the client, separately, or at both locations.

Another way in which transcoding can be managed is to re-transcode document data based on commands received from the client, rather than turning the document into a competed audio file. For example, if the client command indicated to page back in the document, transcoding can then go back one page and then redo conversion from that point on, and then stream from there. The method can further include streaming the speech file to the mobile client over an IP-based communications channel or a cellular carrier to the mobile client.

The method can further comprise retrieving the data from a data source and processing commands that facilitate navigation of the data by at least one of character, word, sentence, paragraph, page, data type, or document type. The commands can be input via speech signals by the user to the mobile client. The method can further comprise converting the data using the TTS engine. The data, which is a document, can be navigated via voice commends to the mobile client.

Figure 6:
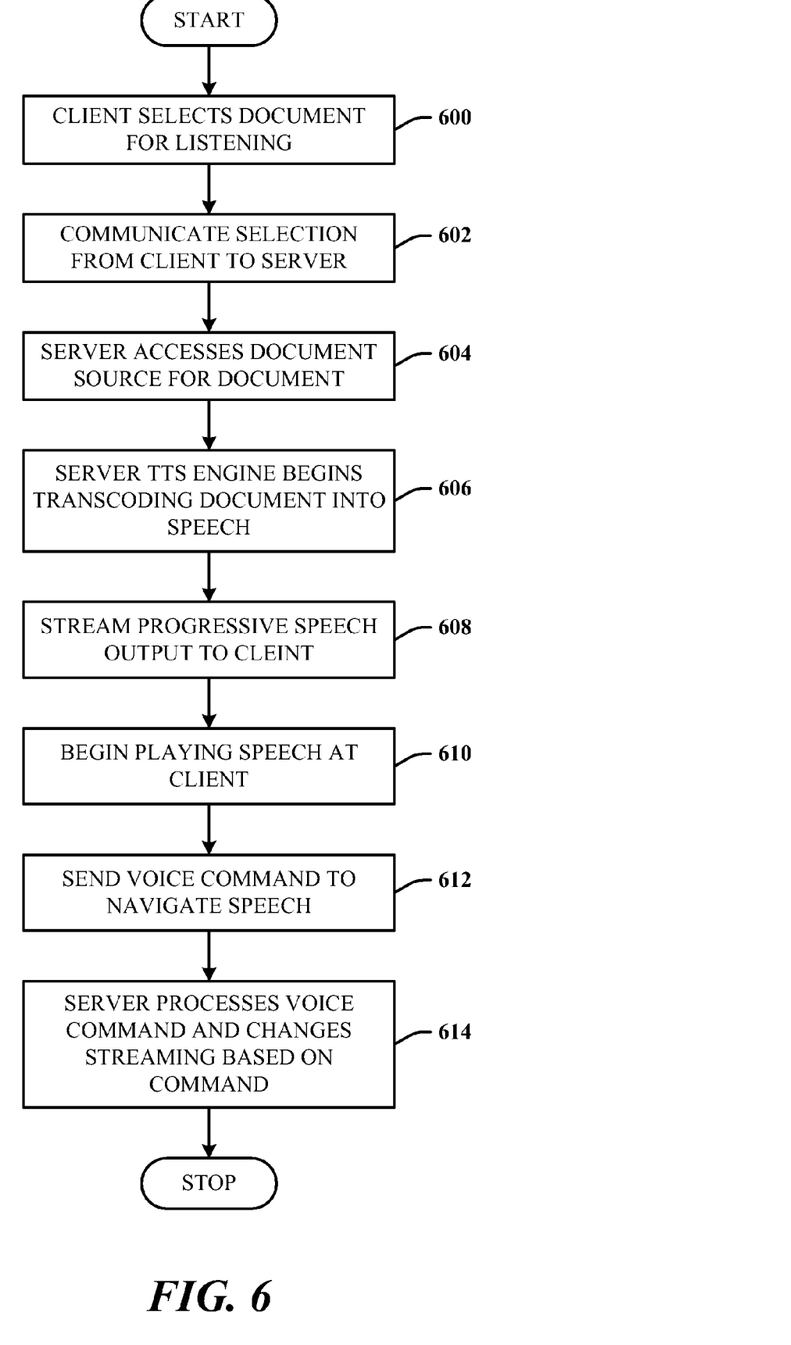
FIG. 6 illustrates a method of initiating document creation and playback for aural input.

FIG. 6 illustrates a method of initiating document creation and playback for aural input. At 600, a client selects a document for listening. At 602, the selection is communicated from the client to the server. At 604, the server accesses a document source for the document. At 606, a server TTS engine begins transcoding the document content into speech. At 608, the progressive speech output of the engine is streamed to the client. At 610, the client begins playing the speech. At 612, the user voices a command to navigate the speech. At 614, the command is sent to the server and the streaming is controlled to change according to the command. Streaming control can be to go back to earlier data in the server cache and re-start streaming of the audio data at that point forward, for example.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
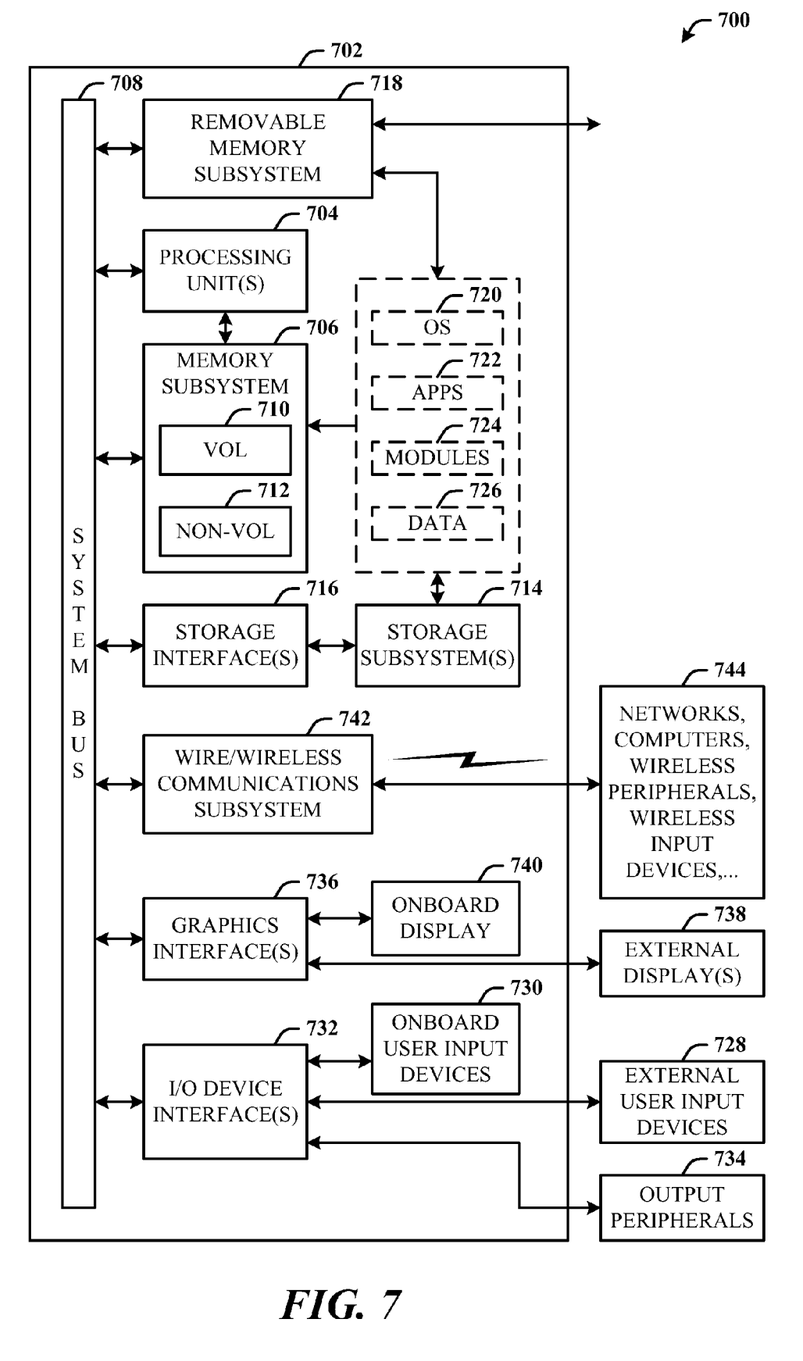
FIG. 7 illustrates a block diagram of a computing system operable to execute document content transcoding, streaming, and presentation in accordance with the disclosed architecture.

Referring now to FIG. 7, there is illustrated a block diagram of a computing system 700 operable to execute document content transcoding, streaming, and presentation in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714, including an operating system 720, one or more application programs 722, other program modules 724, and program data 726.

Where the computing system 700 is utilized as a server, the one or more application programs 722, other program modules 724, and program data 726 can include the transcoding component 102, the document 104, audio signals 106, communications component 108, control component 112, commands 114, and TTS engine 116 of FIG. 1. The server-side functionality in the flow diagram 200 can also be included as the one or more application programs 722, other program modules 724, and program data 726, as well as the negotiation component 304 of FIG. 3, and the methods of FIGS. 4-6, for example.

Where the computing system 700 is utilized as a client, the one or more application programs 722, other program modules 724, and program data 726 can include the mobile client 110, audio signals, and commands 116 of FIG. 1, the client-side functionality of diagram 200. Note, however, that device 302 is a mobile device such as a cell phone, PDA, or the like, and may thereby obviate some of the components illustrated in FIG. 7.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wire/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wire/wireless communication subsystem 742 (e.g., a network interface adapter, onboard transceiver subsystem, etc.) to communicate with wire/wireless networks, wire/wireless printers, wire/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 8:
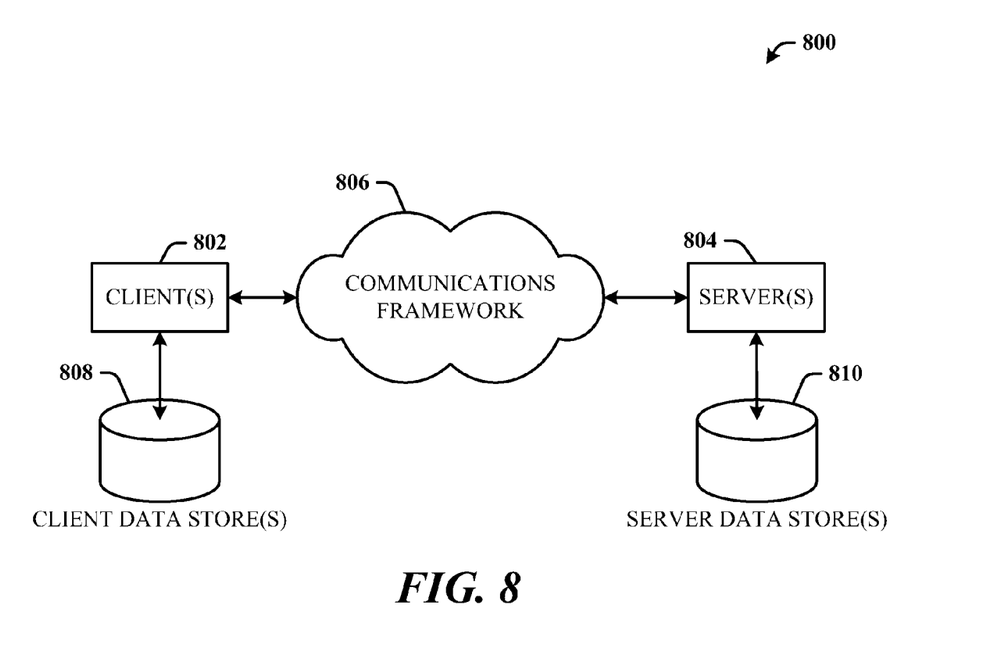
FIG. 8 illustrates a schematic block diagram of a computing environment for document selection and listening.

Referring now to FIG. 8, there is illustrated a schematic block diagram of a computing environment 800 for document selection and listening. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data presentation system, comprising:
   at least a processor programmed to provide:
   a transcoding component for transcoding text of a document into audio signals;
   a communications component for communicating the audio signals to a mobile client for audio presentation;
   a negotiation component for receiving information associated with capabilities of the mobile client for audio presentation; and
   a control component for controlling the presentation of the audio signals based on received commands and the mobile client capabilities.

2. The system of claim 1, wherein the transcoding component transcodes the text of the document into the audio signals in response to selection of document information on the mobile client.

3. The system of claim 1, wherein the text of the document includes text of a word processing document, a spreadsheet document, a presentation document, email content, email header information, email related information, or email attachment.

4. The system of claim 1, wherein the communications component streams the audio signals to the mobile client, the streaming comprising streaming already transcoded portions of the document while other portions of the document are being transcoded.

5. The system of claim 1, wherein the received commands originate from a vehicle-based client.

6. The system of claim 1, wherein the received commands are generated from speech input to the mobile client.

7. The system of claim 1, wherein the received commands are generated based on tactile interaction with the mobile client.

8. The system of claim 1, wherein the communications component receives the commands and communicates the audio signals to the mobile client via at least one of a cellular carrier or an IP-based communications technology.

9. A computer-implemented data presentation system, comprising:
   at least a processor programmed to provide:
   a transcoding component for converting text of a document into a speech file in response to request of the document by a mobile client, the speech file including data associated with one or more embedded links in the document;
   a communications component for receiving the request and communicating the speech file to the mobile client for audio output, the communication comprising communicating already converted portions of the document while other portions of the document are being converted; and
   a control component for controlling the presentation of the speech file based on commands received from the mobile client.

10. The system of claim 9 wherein the data associated with one or more embedded links in the document is obtained and transcoded into the audio signals.

11. The system of claim 9, wherein the text of the document includes text of a word processing document, a spreadsheet document, a presentation document, email content, email header information, email related information, or email attachment, which are converted into the speech file for audio output at the mobile client.

12. The system of claim 9, wherein the communications component streams the speech to the mobile client over an IP-based communications channel in response to commands originated from speech input to the mobile client, the commands facilitating navigation of the document text via navigation of the speech file relative to a starting point and an ending point of the speech file.

13. The system of claim 9, wherein the control component receives and processes commands that facilitate navigation of the document text by character, word, sentence, paragraph, page, data type, and document type.

14. The system of claim 9, wherein the control component receives a request in response to selection of document information on the mobile client, the transcoding component converts the text of the document into speech in response to the request, and the communications component streams the speech to the mobile client for audio output.

15. A computer-implemented method of presenting data, using at least a processor and a memory operatively coupled to the at least one processor, comprising:
   receiving a request for data from a mobile client;
   converting the data into a speech file in response to the request;
   communicating speech data of the speech file to the mobile client, the communication comprising communicating already converted portions of the speech data while other portions of the data are being converted; and
   controlling presentation of the speech data based on commands received from the mobile client.

16. The method of claim 15, further comprising streaming the speech file to the mobile client over an IP-based communications channel or a cellular carrier to the mobile client.

17. The method of claim 15, further comprising:
   retrieving the data from a data source; and
   processing commands that facilitate navigation of the data by at least one of character, word, sentence, paragraph, page, data type, or document type.

18. The method of claim 15, wherein the commands are input via speech signals to the mobile client.

19. The method of claim 15, further comprising converting the data using a test-to-speech engine.

20. The method of claim 15, further comprising navigating through the data, which is a document, via voice commands to the mobile client.

* * * * *